under 35 U.S.C. 154(b) by 1376 days.

United States Patent
Trappe

(10) Patent No.: US 8,314,960 B2
(45) Date of Patent: Nov. 20, 2012

(54) METHOD AND SYSTEM FOR PRINTING VIA APPLICATION SERVERS AND CORRESPONDING COMPUTER PROGRAM AND CORRESPONDING COMPUTER-READABLE STORAGE MEDIUM

(75) Inventor: Bernd Trappe, Berlin (DE)

(73) Assignee: Cortado AG, Berlin (DE)

( * ) Notice: Subject to any disclaimer, the term of this patent is extended or adjusted under 35 U.S.C. 154(b) by 1376 days.

(21) Appl. No.: 11/815,104

(22) PCT Filed: Jan. 31, 2006

(86) PCT No.: PCT/EP2006/000988
§ 371 (c)(1),
(2), (4) Date: Oct. 15, 2007

(87) PCT Pub. No.: WO2006/082086
PCT Pub. Date: Aug. 10, 2006

(65) Prior Publication Data
US 2008/0137133 A1 Jun. 12, 2008

(30) Foreign Application Priority Data
Jan. 31, 2005 (DE) .......................... 10 2005 004 507

(51) Int. Cl.
*G06F 3/12* (2006.01)
*G06K 15/00* (2006.01)
*G06F 15/16* (2006.01)
(52) U.S. Cl. ..................... 358/1.15; 358/1.13; 358/1.14; 709/203; 709/205
(58) Field of Classification Search ........ 358/1.11–1.18; 709/208, 223; 382/232
See application file for complete search history.

(56) References Cited

U.S. PATENT DOCUMENTS

| 6,201,611 | B1 * | 3/2001 | Carter et al. ................. 358/1.15 |
| 6,757,070 | B1 * | 6/2004 | Lin et al. ........................ 358/1.1 |
| 7,334,018 | B2 * | 2/2008 | Elms ............................. 709/205 |
| 7,430,327 | B2 * | 9/2008 | Kodama et al. ............... 382/232 |
| 7,443,523 | B2 * | 10/2008 | Leone et al. ................. 358/1.15 |
| 7,480,068 | B2 * | 1/2009 | Ferlitsch ...................... 358/1.16 |
| 7,613,798 | B2 * | 11/2009 | Mickeleit ..................... 709/223 |
| 7,636,757 | B2 * | 12/2009 | Kemp et al. .................. 709/208 |
| 7,802,195 | B2 * | 9/2010 | Saul et al. .................... 715/769 |
| 2002/0018234 | A1 * | 2/2002 | Fu et al. ....................... 358/1.15 |

(Continued)

FOREIGN PATENT DOCUMENTS
EP 1248185 10/2002
(Continued)

*Primary Examiner* — Satwant Singh
(74) *Attorney, Agent, or Firm* — Perkins Coie LLP; Aaron Wininger

(57) ABSTRACT

The invention relates to a method and a system for printing via application servers, as well as a corresponding computer program and a corresponding computer-readable storage medium, which can be used, in particular, for printing from UNIX and SAP servers to ICA/RDP clients (ICA=Independent Computing Architecture, RDP=Remote Desktop Protocol).

Print support is provided in client-server architectures which include application servers (10), wherein an application server (1) is controlled from at least one client terminal (6) via at least one terminal server (4), and wherein a print order initiated by a user of the at least one client terminal (6) and started on the application server (1) is printed on a desktop printer (7) installed on the client terminal (6), on a network printer installed locally on the client terminal (6), and/or outputted via an optical interface of the client terminal (6).

20 Claims, 3 Drawing Sheets

U.S. PATENT DOCUMENTS

| | | | |
|---|---|---|---|
| 2002/0026385 A1* | 2/2002 | McCloskey et al. | 705/27 |
| 2003/0210417 A1 | 11/2003 | Haltmeyer et al. | |
| 2004/0193678 A1* | 9/2004 | Trufinescu et al. | 709/203 |
| 2004/0236640 A1* | 11/2004 | Kassan | 705/27 |
| 2006/0092469 A1* | 5/2006 | Fu et al. | 358/1.15 |
| 2007/0091365 A1* | 4/2007 | Fu et al. | 358/1.15 |

FOREIGN PATENT DOCUMENTS

| | | |
|---|---|---|
| EP | 1276041 | 1/2003 |
| EP | 1422609 | 5/2004 |

\* cited by examiner

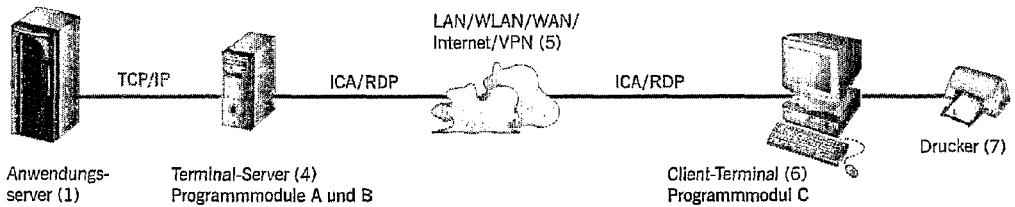
Figur 1
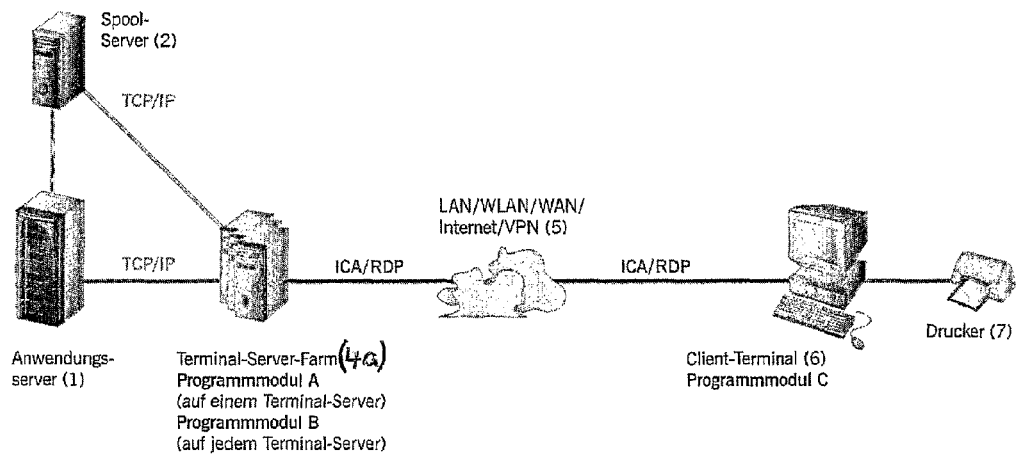
Figur 2
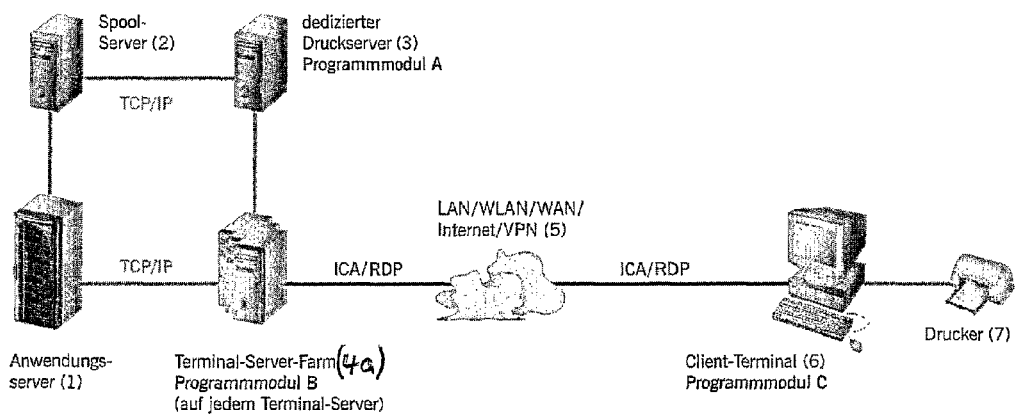
Figur 3

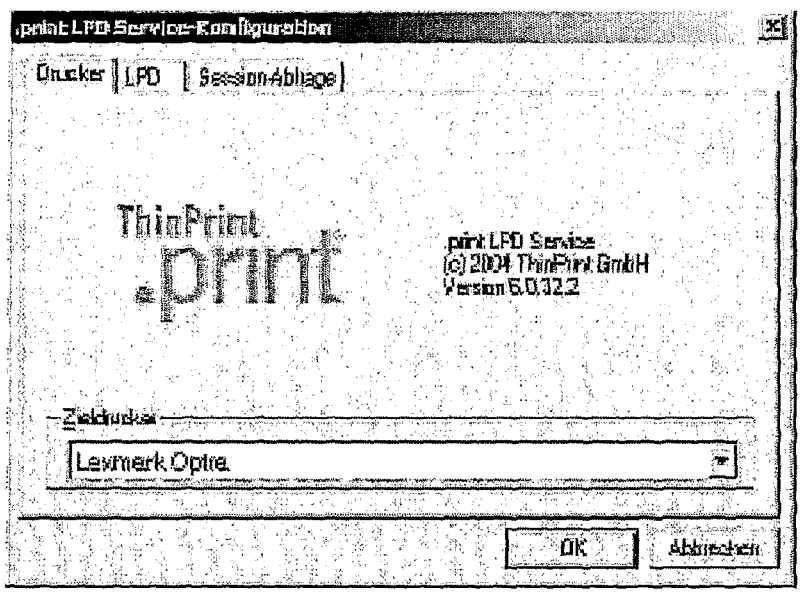
Figur 4a
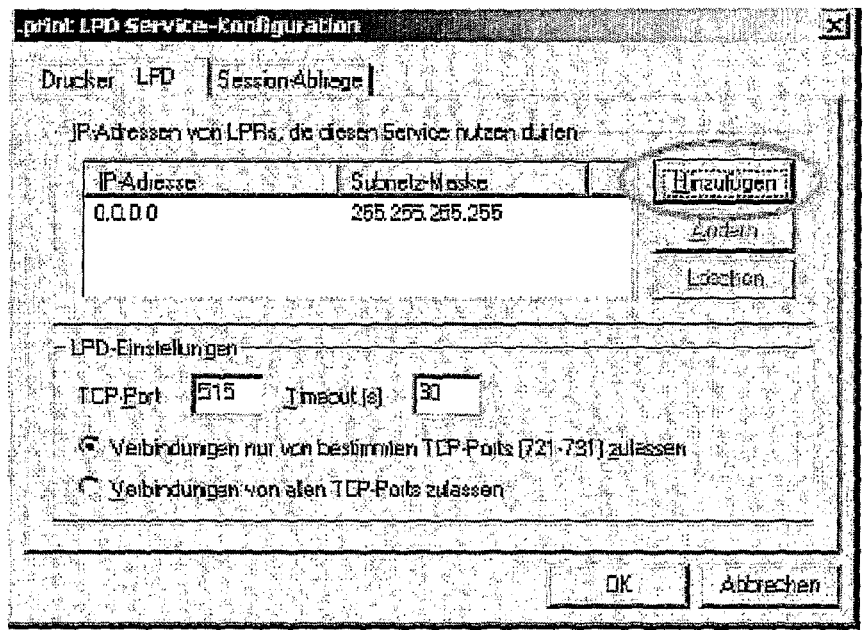
Figur 4b

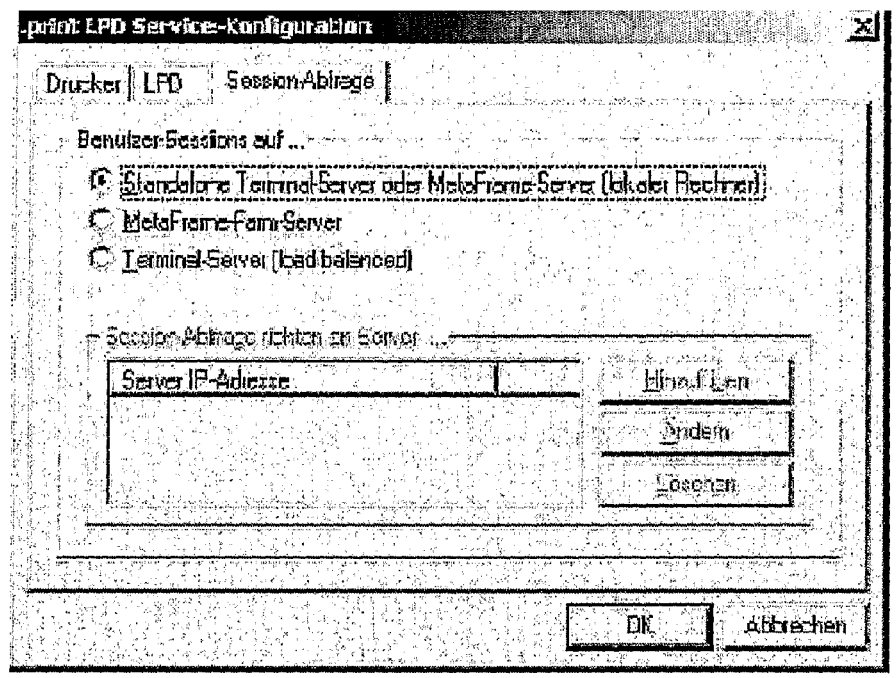
Figur 4c

METHOD AND SYSTEM FOR PRINTING VIA APPLICATION SERVERS AND CORRESPONDING COMPUTER PROGRAM AND CORRESPONDING COMPUTER-READABLE STORAGE MEDIUM

FIELD OF THE INVENTION

The invention relates to a method and a system for printing via application servers, as well as a corresponding computer program and a corresponding computer-readable storage medium, which can be used, in particular, for printing from UNIX and SAP servers to ICA/RDP clients (ICA=Independent Computing Architecture, RDP=Remote Desktop Protocol).

BACKGROUND OF THE INVENTION

In conventional systems using application servers, print orders initiated by users are typically sent to network printers. These network printers are hereby always installed on the application server. The printer may be a single installed printer or be part of a list of installed printers. A user of the application server can then select a printer suitable for the intended purpose from the list.

This solution has the disadvantage that even if a list of network printers is offered, users working on the application server are unable to print in the area accessible to the user. This may occur, for example, when the network printer is installed at the company, whereas the user happens to work on the application server from home. Although the user may be able to select the network printer and even print on that printer, the user will generally be unable with the available conventional solutions to print on the home desktop printer.

A method for printing at a local printer using the resources of a networked remote application server is described in EP 1 422 609 A2. The networked remote application server responds to a print executable request from a local client by downloading a print proxy executable that obtains printing parameters. Upon receipt of printing parameters from the print proxy executable, the networked remote application server generates a printer-dependent data stream and downloads the data stream to the print proxy executable running on the local client. The print proxy executable then uses local printer utilities to execute the print job. However, this application server system doesn't consist of a combination of application and terminal server. Therefore, addressing the client is done in a different way than in terminal server environments.

A server based printer System is described in the European patent Application EP 1 248 185 A2. Also in this case, the client server system doesn't consist of a combination of application and terminal server. Therefore, addressing the client is done in a different way than in terminal server environments.

Although a printing system and method for a terminal server environment is described in the publication US 2003/0210417 A1, this system doesn't comprise an application server. Thus, also in this system addressing the client is done in a different way than in systems using furthermore an application server, as for example for printing from UNIX and SAP servers to ICA/RDP clients.

Another printing system is described in EP 1 276 041 A2. There is proposed that an application server, a data server, and a printer are connected to one another via a communication network. The application server executes application software generated print data for printing an interim result or final result of processing performed by the application software, and sends the print data to the data server. The data server provides the supplied print data to the printer. The printer performs printing in accordance with the provided print data.

SUMMARY

It is therefore an object of the present invention to provide a method and a system for printing via application servers, as well as a corresponding computer program and a corresponding computer-readable storage medium, which expand the available choices when printing with application servers.

The object is solved by the invention with the features recited in the characterizing portion of claims 1, 11, 14 and 16 when taken together with the features recited in the preamble. Advantageous embodiments of the invention are recited in the dependent claims.

The method of the invention for printing via application servers, i.e., for printing from a client terminal when working on an application server, has the advantage that a user working on the application server becomes independent from the network printers installed on the application server and more particularly, the user has always access to the documents he printed. With the method of the invention for printing via application servers, the application server is controlled from at least one client terminal via at least one terminal server, and a print order initiated by a user of the at least one client terminal and started on the application server is printed on a desktop printer set up on the client terminal, on a network printer installed locally on the client terminal, and/or is outputted via an optical interface of the client terminal. The term "print order" hereby refers to the totality of all data (print data) to be sent to a printer and initiated with the same print command (preferably from an application). Printing is preferably performed on a printer, the desktop printer, preferably on the default desktop printer, installed on the user's terminal (client terminal). The user can then access the printed documents by a corresponding user selection of the (default) printer. The method of the invention can be particularly advantageously employed when a user works, for example, from a company-remote terminal (PC or the like), whereas all the (network) printers installed on the application server are located at the company. With conventional solutions, the user could select one of the (network) printers for printing, but not, for example, a desktop printer installed on his PC.

In a preferred embodiment of the method of the invention, print orders started on the application server are forwarded to the client terminal by means of the terminal server on which the session of the user runs. To determine this terminal server, the terminal servers employed to provide communication between application server(s) and client terminals are interrogated by remote query, through which query the terminal server with the user session of interest is determined. Typically, each terminal server is aware of the sessions running on the other terminal servers, so that only a single terminal server needs to be interrogated. Under the Windows® operating system, the remote query is preferably implemented as DCOM query (DCOM=Distributed Component Object Model). DCOM defines the communication of objects in a network. In a preferred embodiment, the user name used by the user for login on the client terminal is also used for querying the terminal servers. However, alternatively or in addition, other user-specific data can be used for identifying the terminal server on which the session of the user runs. The corresponding data/information are then optionally transmitted from the client terminal or terminal server, on which the session of the user runs, to the computer program or the program module which performs the query. In a preferred embodiment, information about the user logged in the application server, for example the user name under which the user is logged in the application server, are transmitted from the application server to the computer program and/or the program module together with the print order initiated by the user.

In a particularly preferred embodiment, the print order started on the application server is integrated in the user session where the print order was initiated. In a preferred embodiment, the print order is integrated by copying the print order to a printer (to the print folder of the user) that is explicitly installed on the terminal server for this purpose. In this case, the print order is printed on the printer which is set up on the client terminal as the default printer.

According to a preferred embodiment, the application server transmits the print order to a spool server, and the spool server in turn transmits the print order to a terminal server or a dedicated print server, so that the print orders started on the application server is forwarded to the identified terminal server by means of a spool server. In a preferred embodiment, the print order is sent by the spool server to the identified terminal server by using the LPR protocol (LPR=Line Printer Remote).

According to another preferred embodiment of the invention, the print data are transmitted at least from the terminal server, on which the session of the user runs, to the client terminal with controlled bandwidth, in particular limited bandwidth, compressed and/or encrypted. In this way, the print data do not take up a large portion of the bandwidth available to the user (client terminal) for communicating with the terminal server/application server when transmitting the print order to the client terminal, which could otherwise block other communication of the user via this communication link.

According to another preferred embodiment of the invention, the print order is transmitted at least from the terminal server, on which the session of the user runs, to the client terminal by using the Independent Computing Architecture protocol (ICA protocol) or the Remote Desktop Protocol (RDP). These protocols enable transmission of user-specific data (as opposed to the TCP/IP protocol which is only able to communicate device-specific). In particular, ICA or RDP allow data to be integrated in the user session.

A system according to the invention for printing via application servers includes at least one application server, at least one terminal server and at least one client terminal, wherein the at least one application server, the at least one terminal several and the at least one client terminal are connected with one another by data transmission means. The system is set up so that a print order initiated by a user of the at least one client terminal and started on the application server is printed on a desktop printer installed on the client terminal, on a network printer installed locally on the client terminal, and/or is outputted via an optical interface of the client terminal. According to the invention, a network printer installed locally on the client terminal instead of the desktop printer set up on the client terminal can also be used for printing from application servers, which was not possible with conventional methods.

For carrying out the method of the invention, the system is preferably set up by installing on at least one data processing system of the system a computer program, which enables the at least one data processing system, after the program has been loaded into storage means of the at least one data processing system, to execute a method for printing via application servers, wherein an application server is controlled by at least one terminal server from at least one client terminal, and wherein a print order initiated by a user of the at least one client terminal and started on the application server is outputted on a desktop printer installed on the client terminal, on a network printer installed locally on the client terminal, and/or via an optical interface of the client terminal.

Such computer programs can be provided in a data or communication network for downloading (fee-based or free of charge, freely accessible or password-protected). The provided computer programs can be used by a method, wherein a computer program according to one of the claims 14 or 15 is downloaded from an electronic data network, for example from the Internet, to a data processing system connected to the data network.

The computer program of the invention is preferably configured in modular form, whereby the individual modules can advantageously be distributed over different data processing systems of the system by loading individual program modules into storage means of the respective data processing system. In a number of preferred embodiments of the invention, at least one module of the computer program may be installed on an application server, a terminal server, a client terminal, a spool server and/or a dedicated print server. When a program module is installed on the application server or on the dedicated print server, the user-specific information can be readily added to an initiated print order. A program module installed on the application server or the dedicated print server can start, for example, the remote query of the terminal server.

One preferred embodiment of the system of the invention includes at least one spool server. The at least one spool server is preferably integrated in the system by inserting the at least one spool server in a communication link formed by the data transmission means between the at least one application server and the at least one terminal server.

A preferred embodiment of the system of the invention includes at least one dedicated print server, which can be interconnected, for example, in the communication link between the at least one application server and the at least one terminal server.

According to the invention, a computer-readable storage medium can be employed, which stores a program that enables a data processing system, after the program has been loaded into storage means of the data processing system, to carry out a method for printing via application servers, wherein an application server is controlled from the at least one client terminal via at least one terminal server, and wherein a print order initiated by a user of the at least one client terminal and is started on the application server is printed on a desktop printer installed on the client terminal, a network printer installed locally on the client terminal, and/or is outputted via an optical interface of the client terminal. If the computer program of the invention includes several program modules, individual program modules can advantageously be stored on different computer-readable storage media.

BRIEF DESCRIPTION OF THE DRAWINGS

The invention will now be described with reference to an exemplary embodiment partially illustrated in the figures. It is shown in:

FIG. 1 an exemplary arrangement for print support for application servers with only a single standalone terminal server, on which a program module is installed, which controls transmission of print orders to the user session (program module A);

FIG. 2 an exemplary arrangement for print support for application servers with a terminal server farm, wherein the program module A is installed only on one of the farm servers;

FIG. 3 an exemplary arrangement for print support for application servers with a dedicated print server, wherein the program module A is installed on the dedicated print server;

FIG. 4a an index tab of the configuration menu for the program module A for selecting the printer;

FIG. 4b an index tab of the configuration menu for the program module A for selecting the spool server; and FIG. 4c an index tab of the configuration menu for the program module A for setting the server for the session query.

DETAILED DESCRIPTION OF THE ILLUSTRATED EMBODIMENTS

The method for print support for application servers is provided for print support in client server architectures that include application servers 1, for example an SAP server. The method or a computer program executing the method can be installed on terminal servers 4 or dedicated print servers 3 running under Windows®. In a preferred exemplary embodiment of the invention, a computer program, hereinafter referred to as program module A, receives print orders from LPRs (=Line Printer Remote), determines from the print order the name of the user who initiated the print order, performs a query to determine the terminal server 4 on which the session of the user who initiated to print order runs, and sends the print order to the printer set up on the terminal server 4. There, the print order is written to the print folder of the user. When the print order A is received, the program module A functions as LPD. In the execution of the method of the invention, the program module A cooperates with an additional computer program (program module B), which is installed on all terminals servers 4. The program module B receives the print orders sent from the program modules A and forwards them to the client terminal 6, where a third computer program (program module C) receives the print orders sent from the program module B and forwards the print order to the printer 7 installed on the client terminal 6. The steps which have been described above only briefly will now be described in more detail. The program module A receives print orders from LPRs and forwards these to the program module B which in turn forwards the print data with the attributes bandwidth control, in particular bandwidth limitation, compression and optional encryption to the program module C by using suitable network protocols, for example ICA or RDP, which permit addressing of the user (unlike, for example, to TCP/IP). Forwarding can be accomplished, for example, by using a print queue of a terminal server 4. The print data arriving on the client side, i.e., the client terminal 6, are then decompressed by program module C and decrypted and forwarded to a printer 7, which can be either the default printer of the client operating system or a printer defined by the program module C.

Users of an SAP system typically use PCs with 32-bit Windows® as client terminal 6. These establish a link to a terminal server 4, for example to a MetaFrame server, by using the ICA clients installed on the client terminal 6. The terminal server 4 is connected with the SAP system and provides to the ICA clients the SAP GUI (=Graphical User Interface). The ICA protocol is used in the MetaFrame sessions which in a preferred embodiment will also be used as print protocol (FIGS. 1 to 3).

Microsoft® terminal servers can also be used instead of MetaFrame servers, in which case the network protocol is RDP instead of ICA.

Three constellations should be distinguished:
1. Only a single standalone terminal server 4 exists on which the program module A is installed (FIG. 1).
2. A terminal server farm 4a exists, wherein the program module A is installed on only one of the farm servers (FIG. 2).
3. The program module A is installed on a dedicated print server 3 (FIG. 3).

In each of these three cases, the program module A receives a print order from an LPR. In addition, the program module A is informed of the user who initiated a print order. In a preferred embodiment, information about the user who has initiated the print order is included in the print order itself. With this information, the program module A can in the constellations illustrated in FIGS. 2 and 3 determine on which terminal server the session of the respective user runs. The program module A then sends the print order to this terminal server; from there, the program module B forwards the print data preferably with controlled bandwidth, in particular limited bandwidth, compressed and/or encrypted to the respective user (for here on, one of the protocols is used which permits to address the user: for example ICA or RDP).

One exemplary embodiment of the invention uses the following system requirements for using the program module A:

The SAP environment is installed and configured. This relates to the SAP system as application server 1, the terminal servers 4, the spool server 2 including LPR, optionally the dedicated print server 3, and the ICA clients on the client terminals 6.

It has proven practical for network security to require administrator rights or domain administrator rights for changing the settings on the terminal servers 4, the dedicated print servers 3, and the spool server 2.

In the exemplary embodiment the program module B is installed on all terminal servers 4.

In addition, an arbitrary, but enabled PCL or PostScript printer with a virtual printer port is connected on the terminal servers 4. If the printer object is intended to be invisible to the user, then only the SYSTEM account is released.

In the exemplary embodiment, all terminal servers of a farm 4a are configured identically.

The program module A can be installed on a dedicated print server 3, if this server is implemented as a standalone server or uses Network Load Balancing (NLB). When using the Microsoft® Cluster Services, the installation process is performed on each cluster node.

All required printers and the program module C are installed on the respective PCs (client terminal 6).

In the exemplary embodiment, the users log in the application server 1 preferably with the same user name as on the terminal server 4. The application server 1 transmits with the print orders the user name used with that application; the user names are, for example, inserted into the "Control File" by the LPR of the spool server 2.

The program module A is required only on one of the terminal servers 4 or on one dedicated print server 3. It may be advantageous in commercial applications of the invention to install a license on the corresponding terminal servers and on the dedicated print server.

If the dedicated print server 3 is implemented as cluster server, then in a preferred solution a separate license is installed on each cluster node.

Advantageously, each terminal server 4 controlled by the program module A may include at least one license.

The following procedure is performed to allow the dedicated print server 3, when using MetaFrame servers from the company Citrix Systems, Inc., to determine on which MetaFrame server 4 the session of the particular user runs, for whom a print order is to be forwarded:

Copy the file MFreg.exe from a MetaFrame server 4. The file is usually found in the directory ...\citrix\system32.

Open the input request on the dedicated print server 3, switch-over to the directory where the file MFreg.exe is stored, and start the file. The IP address of the MetaFrame server 4 on which the session information should be preferably queried, should be provided as a parameter.

Syntax: MFreg IP address

Example: MFreg 192.168.130.1

The program module A (in an exemplary embodiment only required on one terminal server 4, see FIG. 1 or 2) can be installed as follows:
1. Copy the program module A file TPLPDsrv.exe to the designated program directory, e.g.:
C:\programme\ThinPrint\LPD
2. Start the file TPLPDsrv.exe from this directory with the following input request:
TPLPDsrv-install
3. Register with the account of the administrator—preferably a domain administrator of the terminal server farm 4a—, enter the password twice, and confirm with OK.
4. Acknowledge the subsequent instruction with OK.

A confirmation is received that the program module A has been registered as a service. The service is started only after it has been configured.

The user for which the program module A was installed should have local administrator rights at least on cluster nodes or on terminal servers. In addition, the user should optionally also be set up as Citrix administrator in the Citrix management console. Read access may be sufficient.

The program module A can, for example, be configured as follows:

On each terminal server:

Install an arbitrary printer, in this example the Lexmark Optra, and enable the same. The printer is connected with a virtual printer port of the ICA or RDP type (Virtual Channel Protocol).

Printer and enable names are advantageously selected to be identical for all terminal servers. The printer should have the rights of the user in whose context the program module A runs.

On the server with the program module A:

Select Printer:

Start the configuration program for program module A from its installation directory:

e.g. TPLPDsrv-setup

The displayed configuration menu is illustrated in FIG. 4a.

Select the printer Lexmark Optra as PRINTER DESTINATION or entering the same. The program module A uses this printer for forwarding the files to be printed to the program module B.

Select Spool Server:

For example, a configuration menu with an index tab LPD (see FIG. 4b) can be provided to change the settings. The index tab LPD offers, for example, the possibility to select LPR or LPD settings. The most important setting is identifying the spool servers permitted to send the files via LPR to the program module A. The standard setting 0.0.0.0 indicates that no server has yet been specified; this entry can be changed.

New entries can be generated, for example, with the ADD button. A menu may then be displayed for entering the IP address and the subnet mask of, for example, the SAP server:

192.168.130.20

255.255.252.0

In an exemplary embodiment, individual entries can be removed from the list by selecting the DELETE button.

The LPD and LPR are configured in an exemplary embodiment as follows:

TCP-Port

Input the TCP port where the program module A is going to listen to incoming data. Default value: e.g., 515 (see FIG. 4b).

TIMEOUT

Determine with TIMEOUT the time, during which the program module A waits for a response from the spool server until it automatically stops to accept data. Default value: e.g., 30 s (see FIG. 4b).

Permit Connection Only of Specified Ports

Determine if the data to be printed may be transmitted only from LPRs with the TCP-port numbers 721 to 731 or from any TCP port (see FIG. 4b).

Define server for session query (see FIG. 4c):

The program module A must determine on which terminal server the session of the respective user runs. Three constellations have to be distinguished. Depending on the constellation, the index tab SESSION-QUERY of the exemplary setup menu can be configured as follows:
1. If the program module A is installed on a standalone terminal server, then the configuration in the exemplary embodiment is selected as:
"STANDALONE TERMINAL SERVER OR METAFRAME SERVER (LOCAL COMPUTER)";
2. If the program module A is installed on a MetaFrame farm server, then the configuration in the exemplary embodiment is selected as:
"METAFRAME FARM SERVER" with the IP address 127.0.0.1;
3. If the program module A is installed on a Microsoft farm server, then the configuration in the exemplary embodiment is selected as:
"TERMINAL SERVER (LOAD BALANCED)" with the IP address 127.0.0.1;
4. If the program module A. is installed on a dedicated print server, then the configuration in the exemplary embodiment is selected as:
"METAFRAME FARM SERVER" or "TERMINAL SERVER (LOAD BALANCED)", and entering the IP addresses of—optionally alternative—terminal servers.

Defining alternative MetaFrame servers can be advantageous if the preferred MetaFrame server defined with MFreg cannot be accessed.

With the exception of a configuration with Microsoft server clusters, a configuration is finalized by pressing the "OK" button, which also stores the settings. The service of program module A can then be started in the Windows® service directory.

If a Microsoft® server cluster is used as dedicated print server, then in an exemplary embodiment the installation process is performed separately on each cluster load of the print server. Thereafter, one changes to the cluster instance, for which the UNC path of the cluster is given.

Thereafter the following steps are performed:
1. Start the cluster administrator (CluAdmin.exe).
2. Highlight CLUSTER GROUP and select FILE_NEW_RESOURCE.

3. Provide a name for the cluster resource to be installed, e.g., TPLPD.
4. Select GENERIC SERVICE and CLUSTER GROUP and subsequently NEXT.
5. Add with ADD all cluster nodes on which the program module A was installed, and click NEXT.
6. Activate with ADD each of the resources CLUSTER IP ADDRESS and CLUSTER NAME, and confirm with NEXT.
7. Enter TPLPDSrv as name of the Windows® service and continue with NEXT. The program module A subsequently appears in the cluster administrator.
8. Highlight the program module A and then start the service with FILE→BRING ONLINE.

Subsequent changes with the program module A configuration tool are effective only after the service is restarted.
1. Open the SERVICES directory of Windows®.
2. Restart the service.

The cluster administrator (CluAdmin.exe) is started on a Microsoft® server cluster and the service TPLPD is restarted by highlighting the service and selecting:
1. FILE→TAKE OFFLINE and thereafter
2. FILE→BRING ONLINE The process flow during printing will now be described in more detail:

A user initiates from a terminal session a print order (FIG. 3). The application server (1; e.g., an SAP server) sends the print order to the spool server 2, which in turn sends the print order via LPR to the server on which the program module A is installed (dedicated print server 3 or terminal server 4).

The program module A identifies the terminal server 4 on which the user is logged in. The program module A then forwards the print order to the program module B installed on that particular terminal server. The program module B then sends the print data with controlled bandwidth, in particular with limited bandwidth, compressed and encrypted via a WAN, the Internet 5 or another bandwidth-critical connection to the client terminal 6 of the user who has initiated the print order from the terminal session (print protocol ICA or RDP).

The program module C on the client terminal 6 decompresses and decrypts the print data and forwards them to the printer 7—which may be either the default printer of the client operating system or the printer of the program module C.

If the user wants to use a different printer, he then changes in a conventional manner, before initiation of the print order, either the default printer of the client operating system or the printer of the program module C. The printing operation via application server 1 appears to the user as if he were printing on his default desktop printer 7 or on a locally installed network printer, which he could set up on his client terminal 6 in a conventional manner. Alternatively or in addition to actually printing the print order, in an exemplary embodiment the print view can also be (visually) displayed on the display screen. This is also not possible with conventional solutions, because print data cannot be outputted in a format selected by the user who initiated the print order.

Embodiments of the invention are not limited to the aforedescribed preferred exemplary embodiments. Instead, a number of modifications can be envisioned which use the invention in fundamentally different embodiments.

LIST OF REFERENCE SYMBOLS

1 Application server
2 Spool server
3 Dedicated print server
4 Terminal server
4a Terminal server farm
5 Internet
6 Client terminal
7 Desktop printer, printer

ABBREVIATIONS

DCOM Distributed component object model
GUI Graphical user interface
ICA Independent computing architecture
IP Internet protocol (see also TCP/IP)
LAN Local area network
LPD Line printer daemon
LPR Line printer remote
MSCS Microsoft® cluster services
NLB Network load balancing
RDP Remote desktop protocol
s Second(s)
TCP/IP Transmission control protocol over Internet protocol
TP ThinPrint
UNC Naming convention for access to network resources under Microsoft® operating systems (Universal naming convention); example:\\server\directory
VPN Virtual private network
WAN Wide area network
WLAN Wireless local area network

The invention claimed is:

1. A method for locally printing a print order in a network, comprising the steps of:
   connecting a client terminal with a terminal server out of at least one terminal server,
   starting by user input into the client terminal a session on the terminal server,
   assigning the user and the session to each other,
   controlling an application server from the client terminal via the session running on the terminal server,
   initiating a print order out of the session,
   starting the print order from an application running on the application server,
   transmitting from the application server to the at least one terminal server or to a print server the print order together with information about the user associated to the session where the print order has been initiated,
   determining based on the information about the user the session assigned to the user,
   transmitting the print order by means of the terminal server, where the determined session runs, to the client terminal, and
   printing the print order on a desktop printer installed on the client terminal, on a network printer installed locally on the client terminal, or outputting the print order via an optical interface of the client terminal, or a combination thereof.

2. The method of claim 1, wherein the print order started on the application server is integrated in the user session where the print order was initiated.

3. The method of claim 2, wherein the print order is integrated in the user session on the terminal server by writing the print order to a printer folder of the user.

4. The method of claim 1, wherein together with the print order initiated from the user session, information about a user logged on the client terminal is transmitted to the application server.

5. The method of claim 1, wherein the at least one terminal server is remotely queried to identify the terminal server on which the user session runs.

6. The method of claim 1, wherein the print order started on the application server is transferred to the identified terminal server by means of a spool server.

7. The method of claim 6, wherein the spool server transmits the print order to the identified terminal server via Line Printer Remote (LPR).

8. The method of claim 1, wherein the print order is transmitted with at least one of controlled bandwidth, compression and encryption at least from the terminal server, on which the user session runs, to the client terminal.

9. The method of claim 1, wherein the print data are transmitted at least from the terminal server, on which the user session runs, to the client terminal by using an Independent Computing Architecture Protocol (ICA protocol) or a Remote Desktop Protocol (RDP).

10. The method of claim 1, wherein at least a part of the at least one terminal server is configured for enabling sessions of different users to run in parallel.

11. The method of claim 1, wherein the print order is transmitted from the terminal server to the client terminal via the communication link established by connecting the client terminal with the terminal server.

12. A system for locally printing a print order in a network having application servers, comprising:
at least one application server,
at least one terminal server, and
a client terminal,
wherein the client terminal is connected with a terminal server out of the at least one terminal server, wherein on the terminal server a session is started by user input into the client terminal, wherein the user and the session are assigned to each other, and where an application server is controlled from the client terminal via the session running on the terminal server,
wherein the system is configured to:
initiate a print order out of the session,
start the print order from an application running on the application server,
transmit from the application server to the at least one terminal server or to a print server the print order together with information about the user associated to the session where the print order has been initiated,
determine based on the information about the user the session assigned to the user,
transmit the print order by means of the terminal server, where the determined session runs, to the client terminal, and
print the print order on a desktop printer installed on the client terminal, on a network printer installed locally on the client terminal, or outputting the print order via an optical interface of the client terminal, or a combination thereof.

13. The system of claim 12, further comprising at least one spool server interposed in a data transmission link between the at least one application server and the at least one terminal server.

14. The system of claim 12, further comprising at least one dedicated print server interposed in a data transmission link between the at least one application server and the at least one terminal server.

15. The system of claim 12, wherein at least a part of the at least one terminal server is configured for enabling sessions of different users to run in parallel.

16. A non-transitory computer-readable medium having stored thereon a computer program which enables a data processing system, after the computer program has been loaded into storage means of the data processing system, to execute a method for locally printing a print order in a network, the method comprising:
connecting a client terminal with a terminal server out of at least one terminal server,
starting by user input into the client terminal a session on the terminal server,
assigning the user and the session to each other,
controlling an application server from the client terminal via the session running on the terminal server,
initiating a print order out of the session,
starting the print order from an application running on the application server,
transmitting from the application server to the at least one terminal server or to a print server the print order together with information about the user associated to the session where the print order has been initiated,
determining based on the information about the user the session assigned to the user,
transmitting the print order by means of the terminal server, where the determined session runs, to the client terminal, and
printing the print order on a desktop printer installed on the client terminal, on a network printer installed locally on the client terminal, or outputting the print order via an optical interface of the client terminal, or a combination thereof.

17. The program of claim 16, wherein the computer program comprises several program modules, and wherein at least one of the program modules is installed on at least one of an application server, a terminal server, a client terminal, a spool server and a dedicated print server.

18. A non-transitory computer-readable storage medium storing a computer program which enables a data processing system, after the program has been loaded into storage means of the data processing system, to execute a method for locally printing a print order in a network, the method comprising:
connecting a client terminal with a terminal server out of at least one terminal server,
starting by user input into the client terminal a session on the terminal server,
assigning the user and the session to each other,
controlling an application server from the client terminal via the session running on the terminal server,
initiating a print order out of the session,
starting the print order from an application running on the application server,
transmitting from the application server to the at least one terminal server or to a print server the print order together with information about the user associated to the session where the print order has been initiated,
determining based on the information about the user the session assigned to the user,
transmitting the print order by means of the terminal server, where the determined session runs, to the client terminal, and
printing the print order on a desktop printer installed on the client terminal, on a network printer installed locally on the client terminal, or outputting the print order via an optical interface of the client terminal, or a combination thereof.

19. The computer medium of claim 18, wherein the computer program is downloaded from an electronic data network to the data processing system connected to the data network.

20. The computer medium of claim 19, wherein the electronic data network comprises the Internet.

* * * * *